under 35 U.S.C. 154(b) by 620 days.

(12) United States Patent
Tan et al.

(10) Patent No.: US 12,102,591 B2
(45) Date of Patent: Oct. 1, 2024

(54) SYSTEM AND METHOD FOR CONTROLLING A MASSAGE APPARATUS

(71) Applicant: OSIM INTERNATIONAL PTE. LTD., Singapore (SG)

(72) Inventors: Kia Tong Tan, Singapore (SG); Gilbert Realuyo, Singapore (SG); Yeung Lau, Singapore (SG)

(73) Assignee: OSIM INTERNATIONAL PTE. LTD., Singapore (SG)

( * ) Notice: Subject to any disclaimer, the term of this patent is extended or adjusted under 35 U.S.C. 154(b) by 620 days.

(21) Appl. No.: 17/275,094

(22) PCT Filed: Sep. 18, 2018

(86) PCT No.: PCT/SG2018/050476
§ 371 (c)(1),
(2) Date: Mar. 10, 2021

(87) PCT Pub. No.: WO2020/060477
PCT Pub. Date: Mar. 26, 2020

(65) Prior Publication Data
US 2022/0054347 A1    Feb. 24, 2022

(51) Int. Cl.
*A61H 7/00*    (2006.01)
*A61H 9/00*    (2006.01)
(Continued)

(52) U.S. Cl.
CPC ........... *A61H 7/007* (2013.01); *A61H 9/0078* (2013.01); *A61H 23/006* (2013.01);
(Continued)

(58) Field of Classification Search
CPC .... A61H 7/007; A61H 9/0078; A61H 23/006; G05B 19/042; G06F 3/013
See application file for complete search history.

(56) References Cited

U.S. PATENT DOCUMENTS

2006/0059426 A1* 3/2006 Ogikubo ............... G11B 27/34
                                                     386/230
2009/0036809 A1    2/2009 Nishio et al.
(Continued)

FOREIGN PATENT DOCUMENTS

CN    202505740 U    10/2012
CN    105310853 A    2/2016
(Continued)

OTHER PUBLICATIONS

International Search Report and Written Opinion of International Searching Authority for International Application No. PCT/SG2018/050476.

(Continued)

*Primary Examiner* — Mark A Connolly
(74) *Attorney, Agent, or Firm* — JCIP; Joseph G. Chu; Jeremy I. Maynard

(57) ABSTRACT

A system and/or massage apparatus to obtain massage data from the massage apparatus (such as a massage chair) for control of a virtual representation of the massage apparatus in a simulated environment is developed. The system and/or massage apparatus is especially suited for a simulated and/or interactive environment such as virtual reality/augmented reality environment. The actual motion(s) of one or more physical massage mechanisms of the massage apparatus is obtained in the form of data signal(s), processed, rendered and displayed in the simulated and/or interactive environment as three-dimensional content. A user interface in the simulated or interactive environment may be used in a real-time or near real-time basis to provide a seamless experience to a user.

18 Claims, 4 Drawing Sheets

(51) Int. Cl.
*A61H 23/00* (2006.01)
*G05B 19/042* (2006.01)
*G06F 3/01* (2006.01)
*G10L 15/22* (2006.01)
*A61H 15/00* (2006.01)

(52) U.S. Cl.
CPC .......... *G05B 19/042* (2013.01); *G06F 3/013* (2013.01); *G10L 15/22* (2013.01); *A61H 2015/0014* (2013.01); *A61H 2201/0149* (2013.01); *A61H 2201/501* (2013.01); *A61H 2201/5048* (2013.01); *A61H 2201/5084* (2013.01); *G05B 2219/2637* (2013.01); *G10L 2015/223* (2013.01)

(56) References Cited

U.S. PATENT DOCUMENTS

| | | | |
|---|---|---|---|
| 2018/0113312 A1 | | 4/2018 | Jung |
| 2018/0250190 A1 | | 9/2018 | Masuda |
| 2018/0286133 A1 | * | 10/2018 | Carmichael .......... G02B 27/017 |
| 2018/0328385 A1 | * | 11/2018 | Le .......................... A61H 9/005 |
| 2019/0294210 A1 | * | 9/2019 | Zhou ...................... G02B 27/01 |

FOREIGN PATENT DOCUMENTS

| | | | |
|---|---|---|---|
| CN | 106406547 A | | 2/2017 |
| CN | 106422057 A | | 2/2017 |
| CN | 106474737 A | | 3/2017 |
| CN | 206007535 U | * | 3/2017 |
| CN | 107616896 A | | 1/2018 |
| CN | 207429337 U | | 6/2018 |
| CN | 108524180 A | | 9/2018 |
| EP | 1110531 A2 | | 6/2001 |
| KR | 10-2018-0042055 A | | 4/2018 |

OTHER PUBLICATIONS

International Preliminary Report on Patentability for International Application No. PCT/SG2018/050476.
Second and Third Written Opinion of International Searching Authority for International Application No. PCT/SG2018/050476.
Chinese Office Action dated Jan. 28, 2023 for Chinese Application No. 201880097710.7.
Search Report of Taiwanese Patent Office dated Sep. 28, 2022 for Taiwan Patent Application No. 108123965.
Korean Office Action dated Aug. 8, 2023 for Korean Application No. 10-2021-7010145.
Chinese Search Report dated Jul. 27, 2023 for Chinese Application No. 201880097710.7.
First Examination Report dated May 27, 2024 for Australian Application No. 2018442007.

* cited by examiner

SYSTEM AND METHOD FOR CONTROLLING A MASSAGE APPARATUS

FIELD OF INVENTION

The present invention relates to a system and method for controlling a massage apparatus.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Existing control device for massage apparatus, such as massage chairs, are typically in the form of ubiquitous in-built 'button type' controller or remote controller. Such controllers usually provide basic user control for operating the massage apparatus, such as, but not limited to speed and directional control. In recent years, these remote controllers co-exist with Smart Devices, i.e. Smart Devices can also be used as wireless controllers.

With the advent of newer technology, simulated environment such as virtual reality (VR) has been applied to various applications including gaming and device control. Such applications usually include the use of a wearable device, such as a VR headset, which provides a user with a 'first person' experience.

Currently wearable devices (e.g. headset) for massage device are typically limited to a plurality of multimedia content (for example waterfall, beach) being provided to a user when he/she is operating the massage device. Exchange of data/information is limited to the VR device and the user, and does not involve the massage device. Further, any exchange of data/information between the VR device and the user is unlikely to achieve a real-time or near real-time, i.e. there is typically a time-lag between the sending and receiving of data between the user and the VR device.

There exists a need to provide a better user experience to a user which extends to wearable devices (such as but not limited to VR devices) interfacing with the massage apparatus and the user.

It is an object to meet the aforementioned need at least in part.

SUMMARY

A system and/or massage apparatus to obtain massage data from the massage apparatus (such as a massage chair) for control of a virtual representation of the massage apparatus in a simulated environment is developed. The system and/or massage apparatus is especially suited for a simulated and/or interactive environment such as virtual reality/augmented reality environment. The actual motion(s) of one or more physical massage mechanisms of the massage apparatus is obtained in the form of data signal(s), processed, rendered and displayed in the simulated and/or interactive environment as three-dimensional content. A user interface in the simulated or interactive environment may be used in a real-time or near real-time basis to provide a seamless experience to a user.

According to an aspect there is a massage apparatus including a processor module arranged in signal communication with a massage drive, the processor module operable to detect at least one state of the massage drive; a controller arranged to send and receive one or more data signal(s) associated with the at least one state of the massage drive; a simulation module arranged in data communication with the controller, the simulation module comprises a data interpreter to transmit or convert the one or more data signal(s) for control of a simulated drive in a simulated environment, the simulation module further comprises a data library; wherein the data library contains pre-programmed control data for selection by the data interpreter, the selection of the pre-programmed control data allows for the control of the simulated drive to synchronize with the at least one state of the massage drive.

In some embodiments the controller comprises a user input/output (I/O) device operable to receive an input of a user.

In some embodiments the I/O device comprises an accelerometer and/or gyroscope to detect or approximate the orientation or position of a user's eye. In other embodiments, a retina eye scanner may be arranged to scan a 'view zone' located at a pre-determined area of the controller, wherein the pre-determined area is operable to detect the sensory input of a user eye via the orientation, position of the user's eye or the eye staring at the view zone for a pre-determined period of preferably three seconds.

In some embodiments the I/O device comprises a voice recognizer/detector operable to receive a voice command for execution or activation of a state of the massage apparatus.

In some embodiments the I/O device comprises one or more biometric input/output mechanisms.

In some embodiments the pre-programmed control data comprises at least one of the following data:—type of motion, speed of motion, and repetition of motion.

In some embodiments the massage drive comprises at least one of the following massage mechanism:—a kneading drive mechanism, a tapping drive mechanism, a forward positioning mechanism, an airbag pump, and a vibrating plate mechanism.

In some embodiments the at least one state of the massage apparatus includes one or more of the following:—an on state, an off state, a massage operation state, wherein the massage operation state includes motion and position states of at least one massage mechanism.

In some embodiments the massage apparatus of any one of the preceding claims, wherein the simulation device is a virtual reality device.

In some embodiments the controller is a wireless controller and includes a Bluetooth communication module.

In some embodiments the massage apparatus is a massage chair.

In some embodiments the one or more data signal(s) include at least one of the following:—speed of the massage drive, position of the massage drive, movement of the massage drive, airbag pressure, temperature, movement rate, movement direction, proximity to a subject's body part.

In some embodiments the simulation module is configured to contain object rendering data to generate/simulate multidimensional objects in the simulated environment, wherein the object rendering data may include visualisation/simulation multimedia content such as a video file, an audio file, still, 360 degree or panoramic images or 3D models and animations, or 3D particle or light effects.

In some embodiments the processor module detects a change in the at least one state of the massage drive, the data interpreter is operable to select a relevant control data to synchronize the simulated drive in the simulated environment with the change in the at least one state of the massage drive.

In some embodiments the synchronization of the simulated drive is between 100 milliseconds (ms) and 1 second, preferably between 100 ms and 0.5 seconds.

In some embodiments the data format of the one or more data signal is in a form {massage mechanism type; position on user; speed/frequency} format.

According to another aspect a system for controlling a massage apparatus including a processor arranged in signal communication with the massage apparatus, the processor operable to detect at least one state of the massage apparatus; a controller arranged to send and receive one or more data signal(s) associated with the at least one state of the massage apparatus; a simulation device arranged in data communication with the controller, the simulation device comprises a data interpreter to transmit or convert the one or more data signal(s) for control of a simulated apparatus in a simulated environment; wherein the simulation device comprises a data library, the simulation module further comprises a data library; wherein the data library contains pre-programmed control data for selection by the data interpreter, the selection of the pre-programmed control data allows for the control of the simulated apparatus to synchronize with the at least one state of the massage apparatus.

According to another aspect a method for controlling a massage apparatus including the steps of:—(a) detecting by a processor at least one state of the massage apparatus; (b) sending by a controller at least one or more data signal(s) associated with the at least one state of the massage apparatus; (c) converting the one or more data signal(s) by a data interpreter associated with a simulation device for control of a simulated apparatus of the massage apparatus in a simulated environment; the data interpreted arranged to access a data library; wherein the data library contains pre-programmed control data for selection by the data interpreter; and (d) selecting the pre-programmed control data, allowing control of the simulated drive to synchronize with the at least one state of the massage apparatus.

A massage apparatus including a processor module arranged in signal communication with a drive, the processor module operable to detect at least one state of the drive; the processor further arranged to send and receive one or more data signal(s) associated with the at least one state of the drive; a simulation module arranged in data communication with the controller, the simulation module comprises a data interpreter to transmit or convert the one or more data signal(s) for control of a simulated drive in a simulated environment; wherein the simulation device further comprises a data library; wherein the data library contains pre-programmed control data for selection by the data interpreter, and wherein synchronized control of the simulated drive and the drive is allowed based on the control data.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION

Throughout this document, unless otherwise indicated to the contrary, the terms "comprising", "consisting of", "having" and the like, are to be construed as non-exhaustive, or in other words, as meaning "including, but not limited to".

Furthermore, throughout the document, unless the context requires otherwise, the word "include" or variations such as "includes" or "including" will be understood to imply the inclusion of a stated integer or group of integers but not the exclusion of any other integer or group of integers.

It is to be appreciated that the term 'simulated environment' includes environment simulated by computers to provide one or more users with a sensory experience (such as, but not limited to, a simulated visual experience) and can include virtual reality, augmented reality, mixed reality environment. The simulated environment is typically a realistic simulation of an environment and may include the use of multi-dimensional content such as three-dimensional (3D) elements. The simulated environment may also include one or more virtual space.

It is to be appreciated that the term 'pre-programmed' when used in the context to the description refers to data (in whatever format, including binary format) generated or stored for the purpose of providing control to achieve a synchronized representation/rendition of one or more massage mechanisms (when in operation) in the simulated environment.

Unless defined otherwise, all other technical and scientific terms used herein have the same meaning as is commonly understood by a skilled person to which the subject matter herein belongs.

According to an aspect of the present disclosure there is a massage apparatus including a processor module arranged in signal communication with a massage drive (which is a physical drive), the processor module operable to detect at least one state of the massage drive; a controller arranged to send and receive one or more data signal(s) associated with the at least one state of the massage drive; a simulation module arranged in data communication with the controller, the simulation module comprises a data interpreter to transmit or convert the one or more data signal(s) for control of a simulated drive in a simulated environment, the simulation module further comprises a data library, the data library contains a plurality of pre-programmed motion data for selection by the data interpreter.

It is appreciable that the processor module, controller, and simulation module may be integrated (wholly or in part) with the massage apparatus or these may be separate and independent devices which form part of a system for controlling the massage apparatus.

The simulation module may be a three-dimensional (3D) content simulation device. The simulation module may include a rendering sub-module for rending and display of one or more simulated massage mechanism(s).

Figure 1:
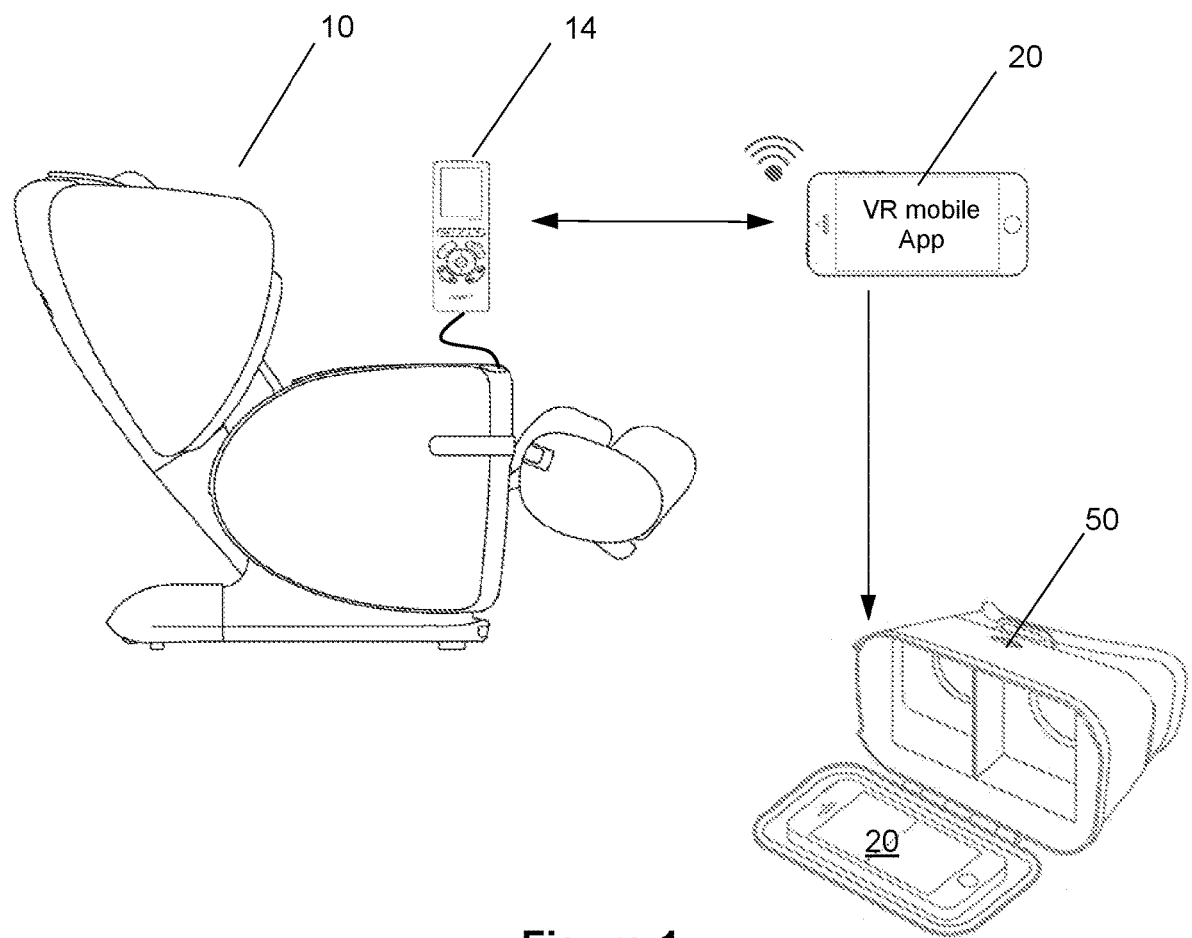
FIG. 1: illustrates a perspective view of a system for controlling a massage apparatus in accordance with some embodiments.
Figure 2:
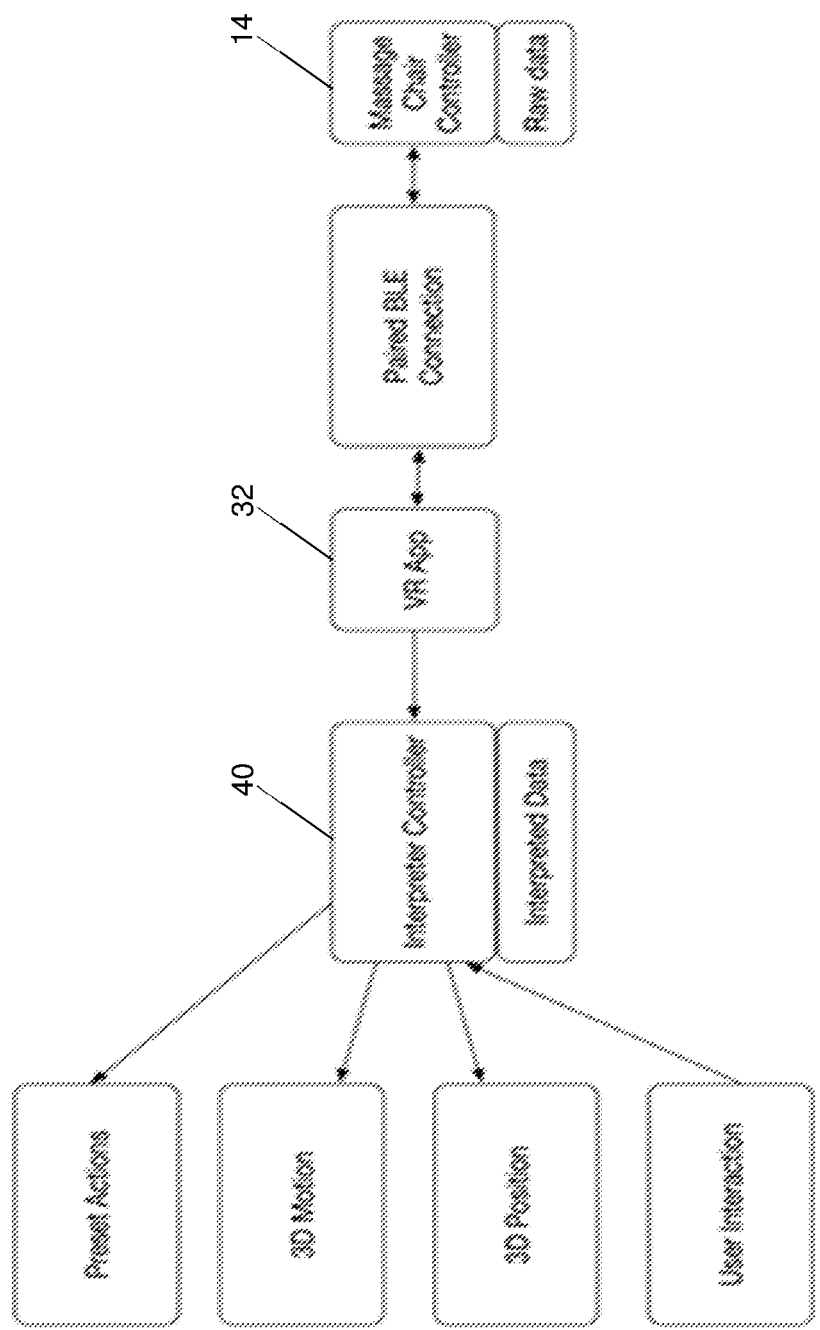
FIG. 2: is a schematic diagram showing a massage apparatus according to some embodiments with particular emphasis on the input and output associated with an interpreter controller.
Figure 3:
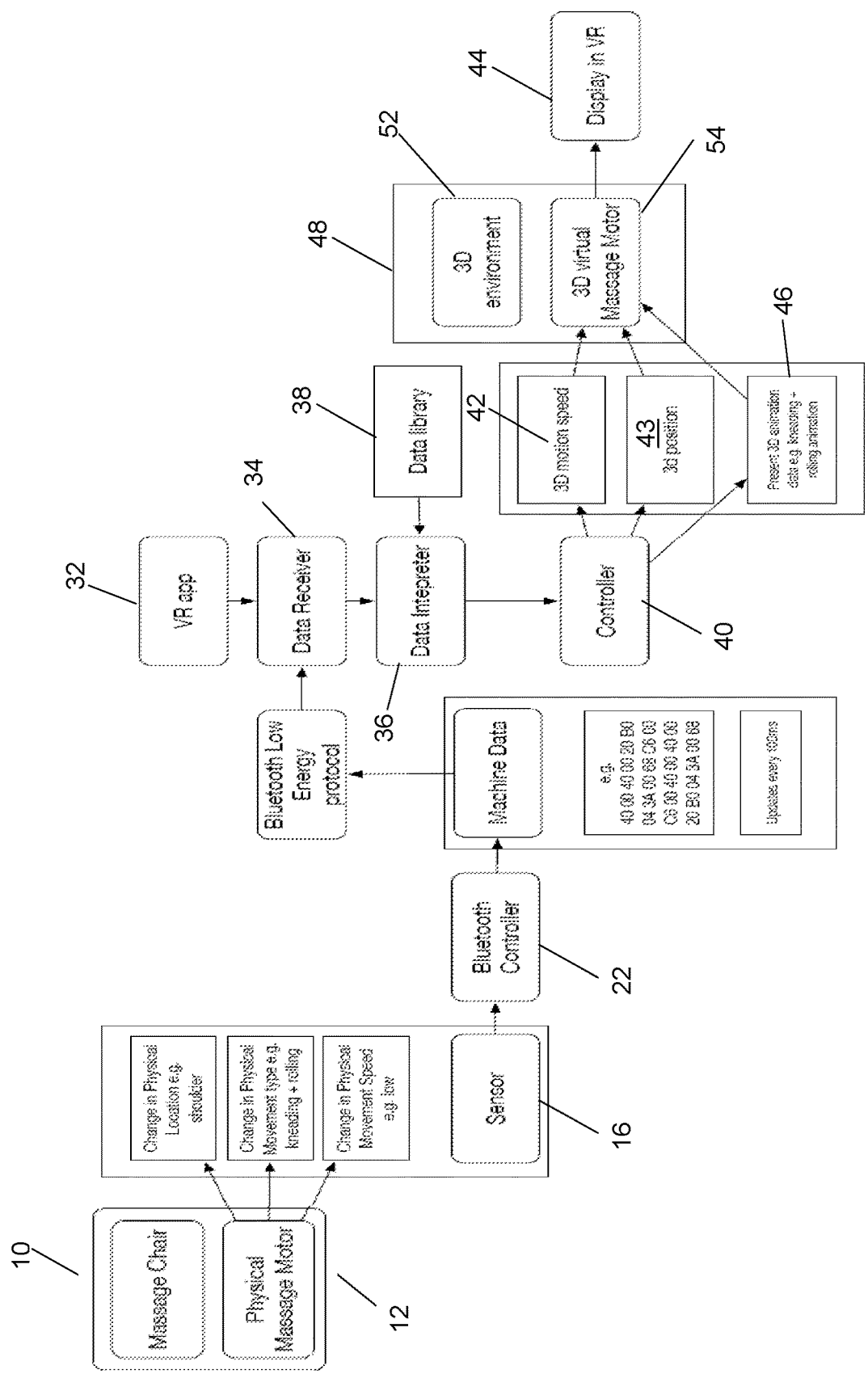
FIG. 3: is a schematic diagram illustrating the flow of data between the various elements of the massage apparatus and/or massage system in accordance with some embodiments.

Referring to FIGS. 1 to 3, the massage apparatus is in the form of a massage chair 10. Massage chair 10 comprises at least one massage drive 12 to provide massage to one or more areas on a user's body (when present). Each of the at least one massage drive 12 may include one or more massage mechanisms. The one or more drives include elements which are electrically and/or electronically driven by electromechanical components and computer programs (not shown) that create the massage combinations and sequences to a user. Example of the aforementioned elements includes one or more electrical or mechanical motors operable to drive or activate various massage mechanisms to provide massage to a user (not shown).

In some embodiments, the at least one massage drive 12 may correspond to one or more massage mechanisms.

Examples of massage mechanisms driven by motor include (but is not limited to) one or more kneading drive mechanisms, one or more tapping drive mechanisms, one or more z-axis positioning mechanisms, one or more airbag pumps, one or more vibrating plate mechanisms, one or more forward positioning mechanisms and one or more heating elements. The one or more drives comprise a processor module for implementing logic control or circuitry which can be hardwired onto a printed circuit board (PCB). The forward positioning mechanisms may include the z-axis positioning mechanisms.

In some embodiments, the kneading and tapping drive mechanisms may include one or more rollers. In some embodiments, the massage mechanism(s) may include rollers, airbags or the like to provide massage to a user.

Other examples of the drive may include temperature regulator(s) such as heaters or coolers to provide user with a desired temperature.

The printed circuit board for implementing logic control or circuitry may comprise integrated circuit (IC) chips mounted thereon to provide processing capabilities. The processor module may comprise one or more sensors 16 operable to detect at least one state or a change of one or more states of the drive massage 12, such as:
  (i.) a motion of the massage drive/massage mechanism 12, for example, movement of the drive/massage mechanism 12 about an axis (x, y and z), rotational movement about a point, combination movement, etc.
  (ii.) a location or a change in location of one or more drive mechanisms along the massage chair, which can correspond to a change in location of a massage position of a subject;
  (iii.) a type or a change in the type of drive mechanisms, such as from a tapping drive mechanism to a kneading drive mechanism, or vice versa;
  (iv.) a speed or a change in speed of one or more drive mechanism(s), such as from a low to a high speed.

The at least one sensor 16 may include a position sensor, a movement sensor, a speed sensor, a temperature sensor, a pressure sensor etc. These sensors 16 work in tandem to detect the change in states of the drive or massage drive/mechanisms 12.

The controller 14 is operable to communicate with the simulation module 20. The simulation module 20 contains object rendering data to generate/simulate multi-dimensional objects in the simulated environment. For a three-dimensional object, object data may include be three-dimensional geometry with spatial coordinates, shapes, textures, and/or other physical properties. It may also contain light source(s), camera view point as well as particle effects for rendering various virtual scenes and simulated objects. Simulated objects may include simulated animation or multi-dimensional objects (e.g. three dimensional objects) of the massage apparatus 10 and/or massage mechanisms and is capable of receiving and/or storing a plurality of massage data, such as control data. The control data is especially suited for producing the multi-dimensional content in a simulated environment. The simulated environment includes 'virtual reality' or 'augmented reality' context or format. This simulation module 20 can be supplemented by a gear, such as a virtual reality head gear 50.

The state or change in state of the massage drive 12 may be converted into a data format suitable for being sent by the controller 14. The conversion may include, for example, an analogue to digital (A2D) conversion. It is appreciable that the raw data associated with the drive mechanism(s) can be in the form of electrical signals such as voltage and current signals. These electrical/electronic signals are converted to massage data signals which can be correlated to a massage motion, location, drive mechanism(s) utilized for the massage, speed and frequency of massage. State of the drive may include a switched off state, a switched on state, operation states including motion, location, speed etc. An example of the data format includes location data in the form of either {upper, middle, lower} portion, drive motions in the form of {knead, tap, roll, temperature}, and motion speed in the form of {low, medium, high}. Each of the massage data signal may be represented by a series of binary '1's and '0's.

The controller 14 arranged to send and receive the data signal(s) associated with the at least one state of the drive can be a wired or a wireless controller based on one or more communication protocol, such as, but not limited to, Wi-Fi, Bluetooth, Bluetooth Low Energy (LE) etc. In some embodiments, the controller 14 is located at a suitable location or integrated as part of the massage chair 10 or embedded on a side panel/arm of the massage chair 10. In other embodiments, the controller 14 can be a plug and play device such as a USB dangle insertable or attachable to a suitable input/output device on the massage chair 10.

Besides utilized to send and receive data signal(s), the controller 14 may also function as a controller of the massage chair 10, thereby allowing a user to control the massage chair 10 and send a control signal from the controller 14 to the processor module to activate a massage program, procedure, routine or function by pressing an actuator, such as a button, on the controller 14.

The processor module is programmed to issue all the commands stored in the program to the electromechanical components driving the massaging features. When the massage chair 10 is running a program, the processor module is in periodic or constant communication with a user input device, such as a remote controller (if not controller 14) to receive commands from the remote controller.

The simulation module 20 can be a computer device. The computer device can be a desktop PC, laptop PC, or a mobile device. The mobile device can include devices such as, but not limited to, a smart phone or a tablet device. The computer device 20 comprises a communication module 22 adapted to communicate with the controller 14. In some embodiments the communication module 22 is integrated with the computer device 20 in the form of one or more integrated circuit chip(s). In other embodiments the communication module 22 can be a plug and play device such as a USB dongle insertable or attachable to a suitable input/output device on the computer device 20.

The three-dimensional content simulation module/computer device 20 may be installed with a dedicated software application colloquially referred to as 'VR app' 32. When executed, the VR app 32 causes the computer device 20 to receive the data signal(s) via a data receiver 34. The data receiver 34 may be a data storage device such as a memory store/buffer. The received data is then sent to a data interpreter 36 to transmit or convert the one or more data signal(s) for control of a virtual drive in a simulated environment, which may be displayed on a user interface 44 such as a screen or projector. The screen may be a LCD or LED screen. In some embodiments, the display may be in the form of a hologram display.

The simulation module 20 further comprises a data library 38 arranged in data communication with the data interpreter 36, the data library 38 contains pre-programmed massage data for selection by the data interpreter 36. The pre-programmed massage data associated with a massage mechanism/drive 12 may be based on all possible states of said drive/massage mechanism when in operation. For example the massage data for a drive mechanism comprising a pair of rollers may include the rollers at all possible operation positions, all possible speeds, and all possible motions include the spacing between the pair of rollers.

In some embodiments the object rendering data include multimedia content such as animation of massage mechanisms, such animation may be rendered together with the three-dimensional simulated object in the simulated environment as the simulated drive in accordance with the object rendering data. Such multimedia content data is differentiated from the motion and positional data, which may be regarded as virtual control data. The rendering of any simulated objects could be displayed on the simulated environment once a user selection of the massage mechanism is detected, without the need to wait for subsequent virtual control data. It is therefore appreciable that data packets associated with the objects (i.e. the object rendering data) is sent separately from data packets comprising virtual control data. In other words, before the control data are sent, the data interpreter 36 sends an object rendering data (which can include 3D visualization/simulation data) to a 3D virtual massage motor for display on a user interface 44.

Once the massage data (e.g. control data) from the data library 38 is selected, the data interpreter 36 sends the selected massage data from the data library 38 to a virtual controller (VR controller) 40 to control a virtual drive 54 within the simulated environment 48. As an example, the pre-programmed massage data may include three dimensional motion speed 42, three-dimensional position 43 and type of massage (i.e. kneading and/or rolling) 46. The simulated environment 48 may include a 3D environment 52 and a 3D virtual massage motor 54.

In summary, the data signals received from the controller 14 is processed to activate the massage animation (via virtual controller 40 and motion data which function as control signals) of the physical massage rollers and move in-synchronization with the actual massage rollers in the chair in real-time or near real-time.

In some embodiments, the content simulation module 20 can also function as a remote controller to control the massage chair 10 or to activate a massage program or sequence. It is appreciable that in such embodiments, a user may control the massage chair 10 through the 3D content simulation module 20, and in such embodiments the 3D content simulation module 20 and the controller 14 can be integrated. It is appreciable that in other embodiments another wireless communication module can reside on the massage chair 10 so as to communicate with the integrated 3D content simulation module 20 and the controller 14.

Control of the massage chair 10 can also be achieved by having a wearable device in the form of a head gear 50 designed for the purpose of simulation virtual reality type images/animations. The computer device 20 may be positioned in the wearable device to facilitate user experience. Optical adjustment on the wearable device is provided so that the desired clarity of view can be achieved. In some embodiments, the head gear 50 may comprise the computer device 20.

In some embodiments, once the head gear 50 is positioned on a user, he or she may use the same to control the massage chair 10 through the wireless communication protocol and link established between the computer device 20 and the controller 14. This may be done through a tilt/turn of the head of the user or via other body movements which can be picked up by input devices such as gyroscope and position sensors already on the computer device 20 or on the head gear 50. The body movement can translate into the selection of an option which corresponds to a selection icon viewed by the user wearing the head gear 50, to activate a particular massage sequence or massage type. It is appreciable that the selection and activation may include the selection and activation of massage sequence using other input commands which include voice commands, on the computer device 20 or head gear 50.

In some embodiments, the data library 38 may contain a plurality of pre-programmed massage data for control of a simulated drive in a simulated environment. The simulated environment may include one or more 3D objects and animation relating to a various drive mechanisms, and their relative positions on the massage chair 10.

In some embodiments, control of the simulated drive includes manipulating the virtual drive (which may be in the form of 3D objects or animation) based on the massage data to provide a synchronized experience to the user on a near real-time basis. For example, a virtual roller in the simulated environment represented by a 3D object will be synchronized to the actual roller in the massage apparatus 10, such that when the actual roller is contacting the user (to provide massage), the virtual roller will contact a virtual image of the user in the simulated environment. To account for possible time lag between the virtual roller and the actual roller, the virtual roller may be compensated with 'pre-emptive' position, i.e. the virtual roller may be moved to a ready position before the actual roller starts operating.

Figure 4:
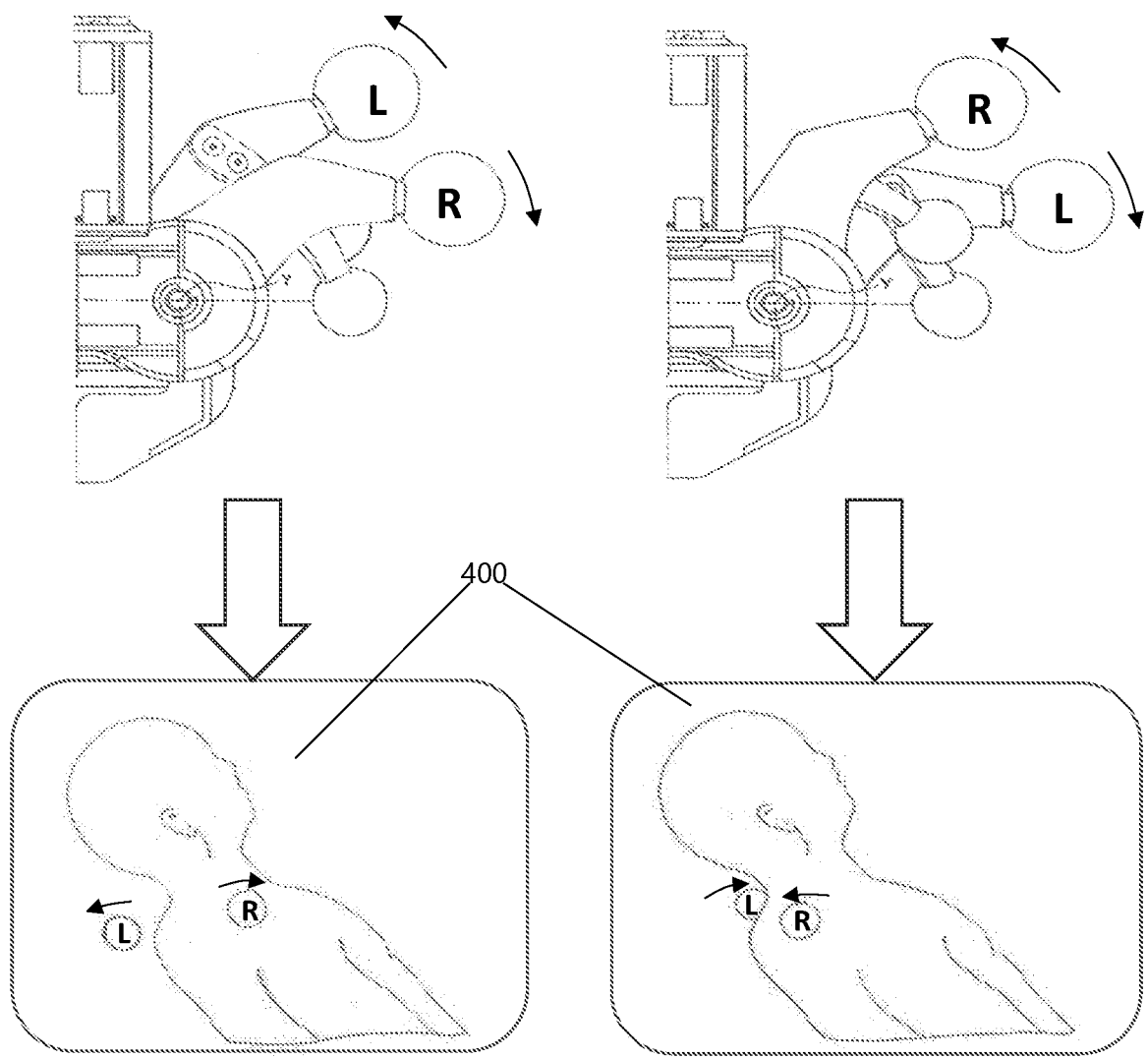
FIG. 4: shows examples of how an actual massage mechanism is rendered and displayed in a simulated environment, the simulated environment includes a three-dimensional virtual reality space.

FIG. 4 illustrates the position of the actual drive mechanism of the massage chair 10 (such as a roller mechanism) and the synchronized display 400 on the 3D simulation module 20.

At the outset (not shown), a virtual representation of the drive mechanism 54 may be displayed. This is before any control data is retrieved from the data library 38 and sent to control the virtual drive 54 in the virtual environment.

As the roller mechanism, which comprises a left roller (L) and a right roller (R) move alternately forwards and backwards with respect to an axis to produce a tapping massage to a user via hitting the specific points on the body of the user, the synchronized display on the 3D simulation module correspondingly changes its position to synchronize with the movement of the physical rollers, i.e. translated to a virtual reality display for view by the user. In some embodiments, a 3D visualization/simulation content may be a virtual roller which is controlled by pre-programmed motions/positions extracted from the data library. As the rendered objects are not generated from scratch but via the object rendering data, and control is based on a pre-programmed data entry (i.e. motion data) from the data library 38, the invention is computationally efficient. Such an arrangement advantageously allows the process of data sending (from controller 14 to computer device 20) and selection, and simulation to be done in a quick manner, achieving a real-time or near real-time simulation of the 3D visualization/simulation in the simulated virtual reality environment for the viewing of a user. In particular, because these programmed motions/positions does not need to be created 'from scratch', the data commands/signals sent to the computer device 20 can simply be in the form of a {massage mechanism type; position on user; speed/frequency} format, which can be achieved using non-huge data format. As an example, the above data command can be {massage roller; lower back; tap 5 times}

It is appreciable that any simulation of 3D programmed motions/positions related to strength of massage may be achieved via the use of one or more data signal(s) associated with the forward positioning mechanisms. When a user sends a command to the controller 14 requiring a higher strength of massage to be performed, the forward positioning mechanism(s) are activated to push the associated drive mechanisms (rollers, tappers etc.) against the user in a z-direction (i.e. protruding in a perpendicular direction from the plane of the massage chair). The drive mechanisms achieve greater contact/pressure against the user thereby creating the sensation of strength. Such data when transmitted to the computer device 14 will be rendered or presented as the said drive mechanisms being positioned at a slightly offset position from the plane of the massage chair.

It is appreciable that the time of synchronization of data from the activation of a massage command/instruction to the simulation of the virtual reality image on the headset 50 or computer device 20 is between 100 milliseconds and 1 second. In some embodiments, the time of synchronization of data from the activation of a massage command/instruction to the simulation of the virtual reality image on the headset 50 or computer device 20 is between 100 milliseconds and 0.5 second.

In some embodiments where the computer device 20 includes the data receiver 34, data interpreter 36 and data library 38, the system requirement for the computer device 20 may be required to include hardware which can support the data processing, conversion and simulation. This may include an operating system, in particular an Android operating system, a Random Access Memory (RAM) of at least 1 Gigabytes (GB), and a processor which can be an ARM type processor. The graphical processing unit (GPU) should have a processing speed of preferably Qualcomm Adreno 540 and above. The computer device 20 may be equipped with gyroscope support, and a device with high resolution such as 4k or higher resolution for screen size is preferred.

In some embodiments, the 3D virtual reality content can be viewed through the VR App 32.

In some embodiments, the programmed motions/positions rendered on the computer device 20 is supplemented by other animation or 3D environments with different themes. For example, the theme can be nature and the animation can include sceneries of trees, plants, waterfalls, with the necessary accompanying music to provide a relaxing user experience.

In some embodiments there may be further enhancements to the overall user experience made on the massage chair 10. These may include a heater to provide for a warm experience for the user, an in built air-conditioner to provide a breeze to the user, etc. Activation of these mechanisms can also be data transmitted to/converted at the computer device 20 for simulation of additional animation.

In some embodiments the data library 38 may be periodically updated to include more 3D content from a network to supplement the content already available, such as downloads from the Internet.

In some embodiments where the computer device 20 functions as a remote controller, data can be sent from the computer device 20 to the massage apparatus for controlling the same. In these embodiments the data will need to be converted by the processor to a form (e.g. electrical voltage/current) to control the physical massage chair 10.

In some embodiments, the computer device 20 or headset 50 comprises a input/output (I/O) device operable to receive a sensory input of a user. The I/O device may include a retina or eye scanner arranged to scan a 'view zone' located at a pre-determined area of the computer device 20 or headset 50, wherein the pre-determined area is operable to detect the sensory input of a user eye staring at the view zone for a pre-determined period. The user view zone may appear on the screen of headset 50. The VR app 32 may be programmed to receive input such that starring at a particular spot on the view point for a pre-determined period, for example, 3 seconds.

In some embodiments, in addition or as an alternative to the user view zone, the computer device 20 and/or the headset 50 may include I/O device to receive a voice input, such as a voice command. The VR app 32 may be programmed to receive input from the I/O device. It is appreciable that other I/O devices may include biometric input/output mechanisms.

It is appreciable that the invention can be applicable to a general class of massage apparatus is not limited to a massage chair and can include, for example foot massager, head massager, arm massager. These massage apparatuses may be integrated with the computer device 20 or headset 50. In some embodiments, the massage apparatus foot massager and the various rollers and positioning on the foot may be synchronized with the computer device 20 or headset 50 may be used.

In some embodiments, the computer device 20 and headset 50 may be integrated.

It should be further appreciated by the person skilled in the art that variations and combinations of features described above, not being alternatives or substitutes, may be combined to form yet further embodiments falling within the intended scope of the invention.

As would be understood by a person skilled in the art, each embodiment, may be used in combination with other embodiment or several embodiments.

The invention claimed is:

1. A massage apparatus including a massage drive;
a plurality of sensors;
a processor module arranged in signal communication with the massage drive for controlling the massage drive, the processor module operable to detect a location of the massage drive with respect to the massage apparatus and a motion of the massage drive via the plurality of sensors;
a controller arranged to receive, from the processor module, data signal associated with the location and the motion of the massage drive; and
a simulation module arranged in data communication with the controller, the simulation module comprises a data interpreter that receives the data signal from the controller and uses the data signal to select a corresponding pre-programmed control data for controlling a display of a simulated drive simulating the massage drive in a simulated environment, wherein the simulated drive is shown at a location corresponding to the detected location of the massage drive and moving in synchronization with the massage drive according to the detected motion of the massage drive.

2. The massage apparatus of claim 1, wherein the controller comprises a user input/output (I/O) device operable to receive an input of a user and to send the input to the processor module.

3. The massage apparatus of claim 2, wherein the I/O device comprises an accelerometer and/or gyroscope to detect or approximate the orientation or position of a user's eye in a 'view zone' located at a pre-determined area of the controller, wherein the pre-determined area is operable to detect the sensory input of a user eye staring at the view zone for a pre-determined period of three seconds.

4. The massage apparatus of claim 2, wherein the I/O device comprises a voice recognizer/detector operable to receive a voice command for execution or activation of a state of the massage apparatus.

5. The massage apparatus of claim 2, wherein the I/O device comprises one or more biometric input/output mechanisms.

6. The massage apparatus of claim 1, wherein the pre-programmed control data comprises at least one of the following data: —type of motion, speed of motion, repetition of motion.

7. The massage apparatus of claim 1, wherein the massage drive comprises at least one of the following massage mechanism: —a kneading drive mechanism, a tapping drive mechanism, z-axis positioning mechanism, an airbag pump, and a vibrating plate mechanism.

8. The massage apparatus of claim 7, wherein the processor module is further operable to detect one or more of the following: —an on state, and an off state of the massage drive.

9. The massage apparatus of claim 1, wherein the simulation module is a virtual reality device.

10. The massage apparatus of claim 1, wherein the controller is a wireless controller and includes a Bluetooth communication module.

11. The massage apparatus of claim 1, wherein the massage apparatus is a massage chair.

12. The massage apparatus of claim 1, wherein the data signal further include at least one of the following: —speed of the massage drive, airbag pressure, temperature, movement rate, movement direction, proximity to a subject's body part.

13. The massage apparatus of claim 1, wherein the simulation module is configured to contain object rendering data to generate/simulate multi-dimensional objects in the simulated environment, wherein the object rendering data includes at least one of the following: —visualisation/simulation multimedia content including one of a video file, an audio file, still, 360 degree; panoramic images; 3D models and animations; 3D particle or light effects.

14. The massage apparatus of claim 1, wherein when the processor module detects a change in the location and the motion of the massage drive, the data interpreter is operable to select a relevant control data to synchronize the simulated drive in the simulated environment with the change in the location and the motion of the massage drive.

15. The massage apparatus of claim 14, wherein the synchronization of the simulated drive is between 100 milliseconds (ms) and 1 second.

16. The massage apparatus of claim 1, wherein the data format of the data signals is in a form {massage mechanism type; position on user; speed/frequency} format.

17. A method for controlling a massage apparatus having a massage drive, the method including the steps of: —
(a) detecting by a processor a location of the massage drive with respect to the massage apparatus and a motion of the massage drive using a plurality of sensors;
(b) receiving from the processor by a controller, separate from the processor, at least one or more data signal associated with the location and the motion of the massage drive;
(c) receiving from the controller the data signal by a data interpreter associated with a simulation module; and
(d) using the data signal by the data interpreter to select a corresponding pre-programmed control data for controlling a display of a simulated drive simulating the massage drive in a simulated environment, wherein the simulated drive is shown at a location corresponding to the detected location of the massage drive and moving in synchronization with the massage drive according to the detected motion of the massage drive.

18. A massage apparatus including
a processor module arranged in signal communication with a drive, the processor module operable to detect a location of the drive with respect to the massage apparatus and a motion of the drive using a plurality of sensors; and
a simulation module arranged in data communication with the processor module, the simulation module comprises a data interpreter that receives the detected location and the detected motion from the processor module and uses the detected location and the detected motion to select a corresponding pre-programmed control data for controlling a display of a simulated drive simulating the drive in a simulated environment, wherein the simulated drive is shown at a location corresponding to the detected location of the massage drive and moving in synchronization with the massage drive according to the detected motion of the massage drive.

* * * * *